United States Patent [19]

Oakley et al.

[11] Patent Number: 4,558,982
[45] Date of Patent: Dec. 17, 1985

[54] EVACUATE AND BACKFILL APPARATUS AND METHOD

[75] Inventors: David J. Oakley, Richland; Oliver J. Groves, Seattle, both of Wash.

[73] Assignee: The United States of America as represented by the Secretary of the United States Department of Energy, Washington, D.C.

[21] Appl. No.: 625,325

[22] Filed: Jun. 27, 1984

[51] Int. Cl.⁴ .............................................. B65B 31/02
[52] U.S. Cl. .................................... 414/288; 414/220; 414/786; 53/432; 53/510
[58] Field of Search ............... 414/217, 219, 220, 745, 414/786, 288; 221/266, 237, 104; 53/432, 510, 91, 92, 93, 86, 89; 376/261

[56] References Cited

U.S. PATENT DOCUMENTS

| | | | |
|---|---|---|---|
| 3,260,383 | 7/1966 | Fitzgerald | 414/220 |
| 3,735,550 | 5/1973 | Moore et al. | 53/432 |
| 3,771,278 | 11/1973 | Gray et al. | 53/432 X |
| 3,828,518 | 8/1974 | Silk et al. | 53/432 X |
| 3,948,416 | 4/1976 | Housman | 221/266 X |
| 4,340,151 | 7/1982 | Cottrell | 221/266 X |

Primary Examiner—Leslie J. Paperner
Assistant Examiner—Darrell G. Dayoan
Attorney, Agent, or Firm—Edward W. Nypaver; Robert Southworth, III; Judson R. Hightower

[57] ABSTRACT

An apparatus and method for treatment of hollow articles by evacuating existing gas or gases therefrom and purging or backfilling the articles with a second gas such as helium. The apparatus includes a sealed enclosure having an article storage drum mounted therein. A multiplicity of such articles are fed singly into the enclosure and loaded into radial slots formed in the drum. The enclosure is successively evacuated and purged with helium to replace the existing gas in the articles with helium. The purged articles are then discharged singly from the drum and transported out of the enclosure.

15 Claims, 6 Drawing Figures

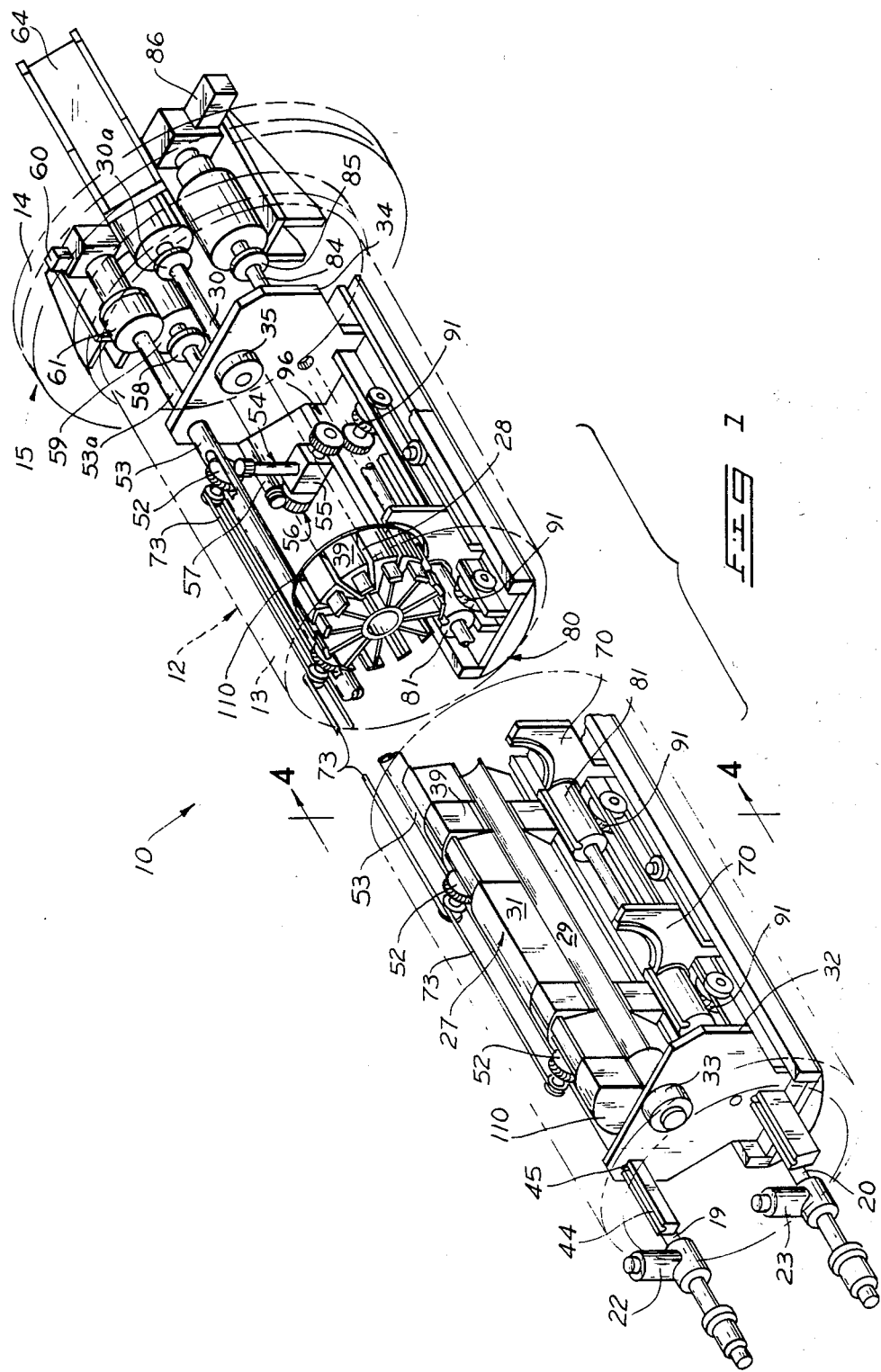

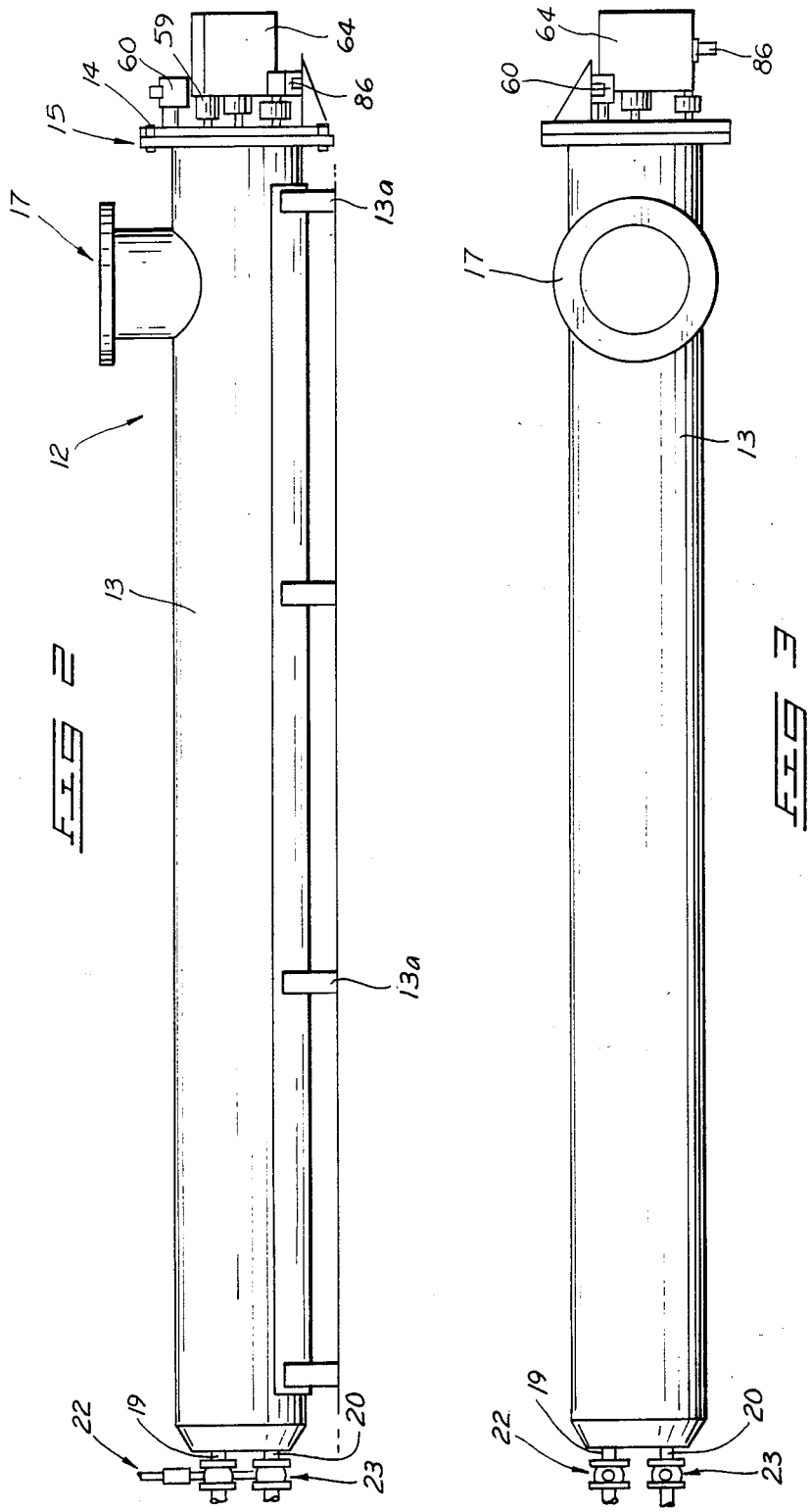

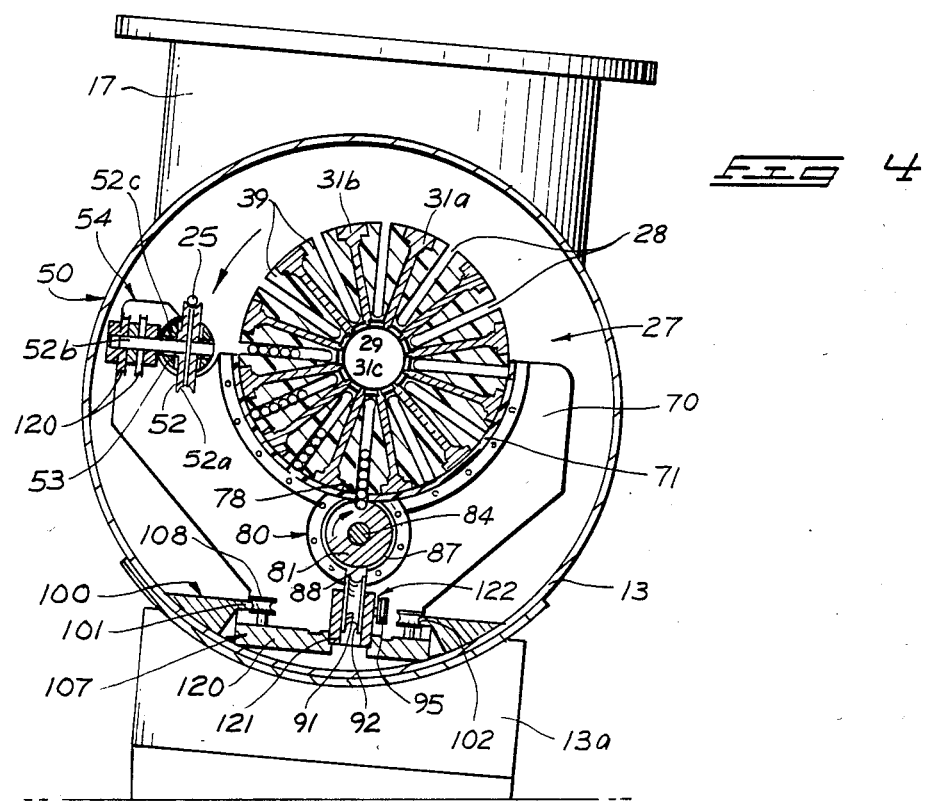
FIG 4
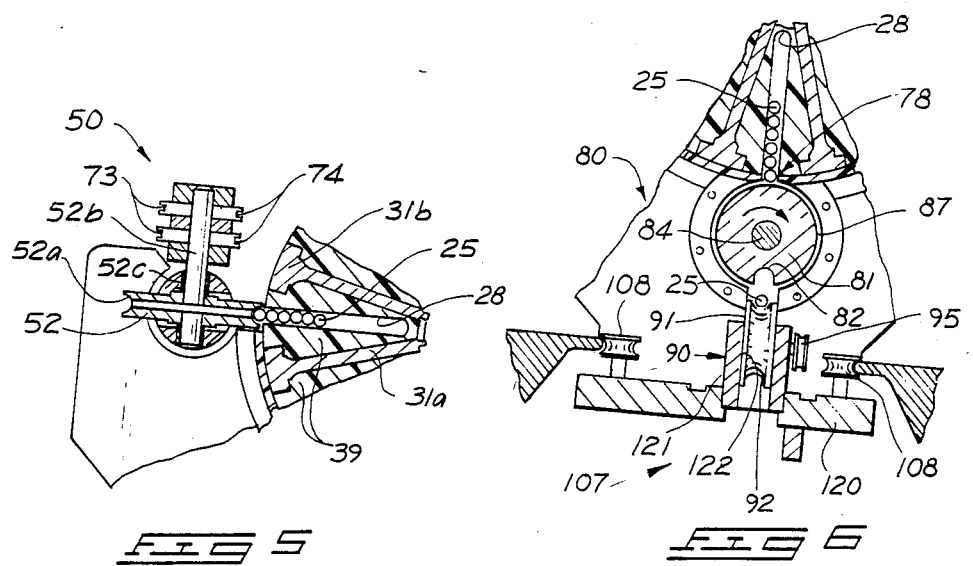
FIG 5
FIG 6

EVACUATE AND BACKFILL APPARATUS AND METHOD

The United States Government has rights in this invention pursuant to Contract No. DE-AC06-76FF02170 between the U.S. Department of Energy and Westinghouse Electric Company.

TECHNICAL FIELD

The technical field of this invention is directed to an apparatus for and method of vacuum treating elongated members to remove diffused or dissolved gases from the elongated members themselves or materials contained therein.

BACKGROUND OF THE INVENTION

Production of nuclear fuel pins used in fast flux breeder reactors involves placing plutonium and uranium oxide fuel pellets within a relatively long tubular fuel pin casing. Plutonium oxides are highly toxic to humans therefore requiring that the fuel pins be loaded within a fully contained production facility. Recently designed nuclear fuel pin assembly systems are preferably completely automated to substantially eliminate the need for human interaction in the assembly process.

An automated nuclear fuel pin assembly system has been developed which incorporates a first section in which the fuel pin casings are loaded with the nuclear fuel pellets. In this first section a nitrogen atmosphere is maintained. The system also uses a second section which must be separate from the first section because it uses a 98% pure helium atmosphere. Helium is used to increase heat transfer from the nuclear fuel pellets to the fuel pin casing during operation of the reactor.

Loaded fuel pins must be transferred from the first section to the second section but this creates problems of leakage of nitrogen into the second section which must be maintained as nearly pure helium. Leakage occurs not only because of direct flow of gases between the sections but also because of nitrogen gas which is diffused into the pellets. Complete removal of nitrogen gas diffused within the fuel pellets takes approximately two to four hours under a vacuum of $10^{-5}$ torr.

The intended production rate of such a plant is one fuel pin every two minutes. Since removal of the nitrogen gas requires approximately four hours it is necessary for an evacuate and backfill subsystem to be used so that a large number of fuel pins can be simultaneously evacuated to remove nitrogen. The evacuated fuel pins are then backfilled with helium and sent on to the second section. In the second section the fuel pins are sealed by pulsed magnetically welding an end cap into the open end of the fuel pin casing.

It is an object of the invention to provide a new and useful apparatus for and method of automatically evacuating a multiplicity of hollow articles and purging or backfilling the same with a desired gas.

It is another object of the invention to provide an evacuate and backfill apparatus which is fully automated and which receives and emits fuel pins in an endwise direction.

It is still another object of the invention to provide an evacuate and backfill apparatus which can maintain vacuum pressures having a very low absolute pressure level.

It is yet another object of the invention to provide an evacuate and backfill apparatus which delicately handles elongated pins while they are being processed therein.

It is a further object of the invention to provide an evacuate and backfill apparatus which receives and emits elongated pins in a singular fashion for subsequent treatment by related automated processing equipment.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

A preferred embodiment of this invention is illustrated in the accompanying drawings, in which:

FIG. 1 is a perspective view showing the preferred embodiment of the evacuate and backfill apparatus of this invention, with portions removed and the exterior of the apparatus shown in phantom in order to clarify the illustration;

FIG. 2 is a side elevational view of the evacuate and backfill apparatus of FIG. 1;

FIG. 3 is a top plan view of the evacuate and backfill apparatus of FIGS. 1 and 2;

FIG. 4 is a cross-sectional view, on an enlarged scale, taken along line 4—4 of FIG. 1;

FIG. 5 is an enlarged fragmentary cross-sectional view showing the roller carriage of FIG. 4 in an unloading position; and FIG. 6 is an enlarged fragmentary cross-sectional view showing the pin removal and outfeed means of FIG. 4 with the singulator cylinder rotated into a discharge position.

DETAILED DESCRIPTION OF THE PREFERRED EMBODIMENT

FIG. 1 shows a preferred embodiment of the evacuate and backfill apparatus constructed according to this invention. The evacuate and backfill apparatus 10 includes a vacuum containment enclosure means 12. The vacuum containment enclosure 12 has a vacuum vessel 13 (shown in phantom in FIG. 1) which is mated with a sealing head 14 at flange connection 15. A flanged vacuum pump connection port 17 is preferably provided at the top of vacuum vessel 13 as shown in FIGS. 2 and 3. Connection port 17 is deleted in FIG. 1 for the sake of clarity. Vacuum vessel 13 can also be provided with legs 13a for supporting the vessel.

Vacuum containment enclosure 12 includes an inlet means 19 and outlet means 20. The inlet and outlet 19 and 20 allow hollow articles, specifically elongated cylindrical pins 25, to enter and leave, respectively, the vacuum containment enclosure 12 in an endwise manner. Inlet means 19 is preferably provided with an inlet closure means such as inlet gate valve 22. Similarly, outlet means 20 is preferably provided with an outlet closure means such as outlet gate valve 23. Inlet and outlet gate valves 22 and 23 are preferably precision gate valves capable of maintaining the very low vacuum pressures of approximately $10^{-5}$ torr which are preferably maintained within vacuum containment enclosure 12.

Elongate pins 25 are typically cylindrical members approximately two to three meters in length and five to ten millimeters in diameter. Although these are the intended elongated members with which this invention is to be used, it is also possible that other types and sizes of elongated members or hollow articles can similarly be processed with appropriate modifications of the evacuate and backfill apparatus.

FIGS. 1 and 4 show a storage drum assembly 27 mounted within vacuum vessel 13. Storage drum assembly 27 is used to hold a plurality of elongated pins 25 or other elongated members. Storage drum 27 is conceptually a cylindrical drum having a plurality of elongate member receiving slots 28 formed radially therein. The preferred embodiment of storage drum 27 includes storage drum hub 29 and storage drum spokes 31a and 31b. Storage drum spokes 31a and 31b radiate outwardly from hub 29 and are connected thereto. Spokes 31a and 31b advantageously extend approximately the entire length of drum assembly 27. Spokes 31a are removably mounted to hub 29 using discontinuous inserts 31c which extend into apertures in hub 29. Spokes 31b are permanently attached to hub 29. Spokes 31a and 31b are attached to front and rear drum end plates 110 using removable fasteners (not shown).

Spokes 31a and 31b serve to position and retain a plurality of blocks 39. Blocks 39 have a plurality of pin receiving slots 28 formed therein for receiving elongate pins 25. Pin receiving slots 28 are preferably deep enough to receive a number of elongate pins in a radial stack (see FIG. 4). Blocks 39 are preferably made of anti-friction nylon or some other low friction, moderately resilient material to prevent damage to pins 25.

Storage drum hub 29 is rotatably mounted in front and rear support plates 32 and 34 using front and rear hub bearings 33 and 35, respectively. Hub 29 is nonrotatably connected to hub drive shaft 30 which extends through flange connection 15 using a sealing means 30a to prevent leakage of gases into vacuum vessel 13. A storage drum drive unit 64 precisely indexes storage drum assembly 27 at angular increments which allow receiving slots 28 to align at a drum infeed means 50 and drum removal means 80 (see FIGS. 4-6).

Incoming pins are transported through the inlet gate valve 22 and inlet means 19 and into the vacuum containment enclosure 12 using a force external to the evacuate and backfill apparatus 10 (see FIG. 1). After a pin is inserted through inlet 19 it is slidably received on a pin guide 44. Pin guide 44 is simply a smooth channel in which the fuel pin or other elongate member slides. Pin guide 44 is preferably mounted to front support plate 32. Adjacent to pin guide 44 is an aperture 45 extending through front plate 32, which allows incoming pins to pass therethrough. Pins pass through aperture 45 and onto additional parts of the drum infeed means 50. Drum infeed means 50 preferably comprises a plurality of infeed rollers 52 which are rotatably mounted in a roller carriage 53 using infeed roller shafts 52b and bushings 52c (see FIG. 5). Infeed rollers 52 are shaped with semicircular grooves 52a along the circumferential periphery thereof for receiving incoming cylindrical fuel pins 25.

Infeed rollers 52 are driven by an infeed roller drive means 54. Infeed roller drive means 54 includes a plurality of infeed drive pulleys 74 which are nonrotatably mounted on infeed roller shafts 52b. The front and rear infeed rollers 52 have only one infeed drive pulley 74 mounted on their associated shaft. The other or intermediate infeed rollers 52 have two infeed drive pulleys 74 mounted side-by-side as shown in FIGS. 4 and 5.

Belts, chains, or other flexible linkages 73 are arranged about the infeed drive pulleys thereby connecting adjacent infeed rollers in a series which drives all infeed rollers at the same speed. Alternatively, the series of infeed drive pulleys can be mechanically interconnected using bevel gear boxes and interconnecting shafts (not shown).

The series of infeed rollers 52 are driven by a roller drive motor 59 which is mounted outside of the containment vessel on sealing flange 14. Roller drive motor 59 connects to a roller drive shaft 57 which extends through sealing flange 14 and has a sealing means 58 for sealing against leakage about the rotating shaft. Such sealing means can be a mechanical seal, packing or other well known shaft sealing systems.

Roller drive shaft 57 is connected to a roller drive splitter 55 by a worm gear set 56. Roller drive splitter 55 turns an infeed roller drive shaft 54 frictionally engages the side of the rear infeed roller 52 thereby turning it and the remainder of infeed rollers through the infeed pulleys 74 and flexible links 73.

Infeed means 50 receives incoming pins 25 from pin guide 44 and moves the pins longitudinally by rolling the pins upon infeed rollers 52. Infeed means 50 includes roller carriage 53 which is pivotally mounted in support plates 32 and 34 thereby allowing the infeed rollers to be tilted toward the storage drum 27 to transfer the elongate pins from the infeed means into receiving slots 28 of storage drum 27. Roller carriage 53 is tilted by an infeed tilt means such as infeed roller tilt drive 60 which is mounted outside the vacuum containment enclosure 12. Roller carraige shaft 53a extends through head 14 and a sealing means 61 is used to prevent leakage thereabout.

FIG. 4 shows a fuel pin 25 which is held within the semicircular peripheral groove 52a of infeed rollers 52. The first or receiving position shown in FIG. 4 has the infeed rollers 52 tilted approximately 5° from vertical because the entire evacuate and backfill apparatus is preferably tilted 5° to the right as shown in FIGS. 4 and 5. The incoming pins are resting within the peripheral groove. A sensor means (not shown) detects full insertion of the fuel pin within the infeed means 50. A control system (not shown) commands the infeed roller tilt drive 60 to rotate the infeed roller carriage 53 approximately 90° clockwise from the position shown in FIG. 4. This second or unloading position causes fuel pins 25 to roll from the infeed rollers into receiving slots 28 as shown in FIG. 5. The receiving slots 28 are preferably inclined at about 5° because of the general tilt of the assembly so that the pins roll thereinto. After unloading the pin, the roller carraige 53 then tilts back into the receiving position and another pin is fed into the evacuate and backfill apparatus 10 through entry 19. This process is repeated until a receiving slot 28 is filled with pins.

Detectors (not shown) are used to detect when each receiving slot 28 has been filled to capacity. The control system of the evacuate and backfill apparatus then advances the storage drum drive 64 into its next position where the next receiving slot 28 is adjacent infeed means 50. In the preferred embodiment of the invention there are twelve receiving slots 28 each being able to receive 10 fuel pins. Receiving slots are preferably equally spaced circumferentially at approximately 30° intervals about storage drum 27.

Storage drum 27 advantageously rotates counterclockwise as seen in FIG. 4. As the storage drum rotates counterclockwise, the receiving slots point downwardly. A member restraining means such as plurality of restraining pieces or plates 70 with antifriction inserts 71 are provided along the underside of drum assembly 25 to prevent elongate pins 25 from rolling from the downwardly pointing slots 28. The restraining pieces are positioned at points along storage drum assembly 27 adjacent to blocks 39. Blocks 39 are immediately adjacent or actually contact inserts 71 which are approximately circular in shape along the contacting surface.

Once all of the receiving slots 28 have been completely filled with fuel pins 25 then it is appropriate to evacuate the apparatus to remove nitrogen and other undesired gases from the fuel pin casings and the fuel pellets which have been inserted in an open end of the casings. Inlet and outlet vacuum gage valves 22 and 23 are first tightly closed in order to maintain the high degree of vaccum developed within the vacuum containment enclosure 12. A vacuum pump (not shown) withdraws nitrogen and other gases existing within the vacuum containment enclosure via vacuum pump connection port 17. Once the vacuum is established within vacuum containment enclosure 12, then the diffused gases contained within the nuclear fuel pellets diffuse outwadly and are withdrawn and removed by the vacuum pump. Complete evacuation of the nuclear fuel pins requires approximately two to four hours under a pressure of approximately $10^{-5}$ torr.

After fuel pins 25 have been sufficiently evacuated then it is desirable to backfill the pins. In the case of the nuclear fuel pins discussed above the pins are backfilled using an approximately pure helium gas (98% or better with the remainder hydrogen). The backfill procedure does not normally require significant time for diffusion of the helium gas because continued processing in the automated fuel pin manufacturing system also takes place in such a helium atmosphere. Extended treatment within the evacuate and backfill appratus with one or more gases is clearly possible. Such gases can be pressurized if necessary for the particular process involved.

Once elongate pins 25 have been properly evacuated and backfilled, then it is necessary to remove them from evacuate and backfill apparatus 10. A drum removal means 80 is provided to remove the fuel pins in a singular manner. FIG. 1 shows that drum removal means 80 includes a plurality of cylindrical singulator units 81 arranged in a longitudinal row beneath storage drum assembly 27. Singulator units 81 have escapement slots 82 formed longitudinally therein. FIGS. 4 and 5 show that singulators 81 are positioned within circular apertures 83 defined by antifriction singulator inserts 87 mounted in each of the restaining pieces 70.

Singulators 81 are connected by a singulator shaft 84 which is rotatably mounted in front and rear support plates 32 and 34, respectively. Singulator shaft 84 extends through sealing head 14 which is provided with a singulator shaft sealing means 85 to prevent leakage. Singulator shaft 84 is connected to a singulator drive means 86 which rotates the singulator shaft and attached singulators.

Singulators 81 rotate to allow individual fuel pins 25 to be received within escapement slots 82 as shown in FIG. 4. The singulators are then rotated. The fuel pins rotate with the singulators, confined within slots 82 by inserts 87. When the singulators reach the discharge position shown in FIG. 6, then the pins drop through discharge opening 88 and onto an outfeed means 90 which conveys them from the vacuum containment vessel 13.

Singulators 81 are then rotated from the discharge position shown in FIG. 6 back to the receive position shown in FIG. 4. Pins 25 are removed repeatedly in this singular fashion until all of the pins in one of the drum receiving slots 28 have been removed. Sensors then recognize the absence of any pins in the downwardly facing receiving slot 28 thereby providing a signal to the control system which is thereafter interpreted into a command for the storage drum drive 64 to index the storage drum so that the next receiving slot 28 is aligned with drum discharge opening 78. This process is repeated until all of the receiving slots 28 are fully emptied.

Elongate pins 25 are transferred by drum removal means 80 to the elongate member outfeed means 90. Outfeed means 90 comprises a plurality of outfeed conveyor rollers 91 which are mounted in a line upon frame plate 120 (see FIG. 4). Outfeed rollers 91 are rotatably mounted upon frame plate 120 by brackets 121 and axles 122. Rollers 91 are preferably constructed with semicircular grooves 92 formed about the circumferential periphery for receiving pins 25 therein. The fuel pins drop onto the line of outfeed rollers 91 which are either rotating or which begin to rotate. Outfeed rollers 91 roll elongate pins 25 through exit 20 and from the evacuate and backfill apparatus.

The outfeed rollers 91 are driven by a plurality of outfeed roller drive belts 94 or similar chains or flexible linkages. Drive belts 94 are arranged around outfeed drive roller pulleys 95. Outfeed drive roller pulleys are turned by the roller drive splitter 55 via gear set 96 as shown in FIG. 1. The roller drive splitter 55 is driven through worm gear set 56 by roller drive shaft 57 as described above.

Vacuum vessel 13 is preferably provided with a rail assembly 100 which is securely mounted within the interior of the vacuum vessel. Rail assembly 100 has side rails 101 and 102 which extend along the length thereof. An internal assembly frame 107 is provided to act as the basic frame for internal components described above. The internal assembly frame 107 includes a frame plate 120 and assembly wheels 108 which are rotatably mounted thereon for rotation about a vertical axis. The assembly wheels 108 allow the longitudinal assembly frame 107 to be rollable upon rail assembly 100.

Front and rear support plates 32 and 34 are rigidly mounted to the longitudinal assembly frame 107. This arrangement allows the infeed means 50, drum removal means 80, outfeed means 90, and other parts of the internal assembly to be easily withdrawn from the vacuum vessel 13 by simply rolling it outwardly therefrom after removing sealing head 14.

The evacuate and backfill apparatus of this invention is preferably constructed with the vacuum containment enclosure being constructed from stainless steel or some other corrosion resistant and very low vapor pressure material thereby allowing high vacuum to be maintained therein. The invernal assembly is also typically made from stainless steel or other durable metallic or plastic substances. Antifriction inserts 71 and 87 and blocks 39 are preferably constructed of nylon. The infeed and outfeed roller drive belts are also preferably made from a relatively low vapor pressure elastomeric materials which maintain their flexibility under nitrogen, helium and vacuum application or as other conditions require.

The evacuate and backfill apparatus of this invention is intended to be used in an overall automated system for manufacturing nuclear fuel pins. There may be other applications where evacuation and backfill of diffused or dissolved gases from elongate pins or other elongate members may be desirable, and the efficient operation and effectiveness of this invention can be easily used therein with obvious modifications.

This description of a preferred embodiment of the invention has been presented for purposes of illustration and example. It is not intended to be exhaustive or to limit the invention to the precise form disclosed. It is intended that the scope of the invention be defined by the following claims.

We claim:

1. An apparatus for successively evacuating the purging hollow articles comprising:
   an enclosure having an inlet and an outlet communicating with atmospheres containing a first and second gas, respectively;
   a drum assembly rotatably mounted within said enclosure for receiving and storing a multiplicity of hollow articles;
   means for feeding said articles singly from sid first gaseous atmosphere through said inlet and onto said drum assembly;
   means for evacuating said enclosure to remove said first gas from said articles;
   means for admitting a second gas into said enclosure for purging said articles with said second gas; and
   means for discharging said purged articles singly from said drum for delivery through sid outlet into said second gaseous atmosphere.

2. An apparatus according to claim 1, wherein said drum assembly is formed with a plurality of circumferentially spaced radial slots extending lengthwise of said drum assembly for receiving said articles in a stacked relation therewithin.

3. An apparatus according to claim 2, including means for periodically indexing sid drum to advance succeeding slots into an article receiving position.

4. An apparatus according to claim 1, wherein said drum assembly comprises an elongated hub, a plurality of spokes connected to said hub and extending radially outwardly therefrom, and laterally spaced antifriction blocks secured to adjacent spokes for defining article receiving slots therebetween.

5. An apparatus according to claim 1, wherein said means for feeding comprises an elongated rotable carriage, a plurality of axially spaced rollers mounted on said carriage for delivering a single article into a position adjacent and lengthwise of said drum assembly, and means for rotating said carriage about an axis thereof to transfer said article from said rollers onto said drum assembly.

6. An apparatus according to claim 2, including means for restraining said elongted articles witin said slots during rotary movement of said drum assembly.

7. An apparatus according to claim 1, including means on said enclosure for closing said inlet and outlet, respectively, during evacuation and purging of said enclosure.

8. An apparatus according to claim 1, wherein said first gas is nitrogen and said second gas is helium.

9. An apparatus according to claim 1, wherein said discharging means comprises a plurality of coaxially aligned rotary cylinders having slots rotatable between an article receiving position in registry with an article containing slot in said drum assembly and an article discharge position.

10. An apparatus according to claim 9, wherein said discharge means includes means for receiving an article from ssid rotatable cylinders and transporting said article axially outwardly through said outlet.

11. A method of evacuating and purging hollow articles comprising:
    feeding a plurality of hollow articles singly from an atmosphere containing a first gas into a sealed enclosure;
    loading a multiplicity of said articles on a storage drum mounted within said enclosure;
    evacuating said enclosure to remove said first gas from said articles;
    introducing a second gas into said enclosure for purging said articles with said second gas; and
    discharging said purged articles singly from said drum for delivery through an outlet into an atmosphere comprised of said second gas.

12. A method according to claim 11, wherein said storage drum is formed with a plurality of radial slots, and inserting said articles into each of said slots in a stacked relation.

13. A method according to claim 12, including indexing said storage drum to advance succeeding empty slots into an article receiving position.

14. A method according to claim 13, including transferring said articles singly from a loaded slot in said drum onto a roller conveyor arrangement and transporting said purged article axially on said conveyor arrangement through said outlet.

15. A method according to claim 11, wherein said first gas is nitrogen and said second gas is helium.

* * * * *